(12) United States Patent
Urrego Bernal (10) Patent No.: US 10,986,944 B1
(45) Date of Patent: Apr. 27, 2021

(54) PLANT TRANSPORTATION SYSTEM

(71) Applicants: C.I. Toyota Tsusho de Colombia S.A., Bogotá (CO); CONSULTING & OUTSOURCING GLOBAL NETWORK S.A.S., Cajica (CO)

(72) Inventor: Julio César Urrego Bernal, Cundinamarca (CO)

(73) Assignees: C.I. Toyota Tsusho de Colombia S.A., Bogota (CO); CONSULTING & OUTSOURCING GLOBAL NETWORK S.A.S., Cajica (CO)

( * ) Notice: Subject to any disclaimer, the term of this patent is extended or adjusted under 35 U.S.C. 154(b) by 0 days.

(21) Appl. No.: 16/875,484

(22) Filed: May 15, 2020

(51) Int. Cl.
*A47G 7/07* (2006.01)
*A47G 7/03* (2006.01)
*A01G 5/06* (2006.01)

(52) U.S. Cl.
CPC .............. *A47G 7/07* (2013.01); *A01G 5/06* (2013.01); *A47G 7/03* (2013.01)

(58) Field of Classification Search
CPC ... A47G 7/07; A47G 7/03; A01G 5/06; A01G 5/00
See application file for complete search history.

(56) References Cited

U.S. PATENT DOCUMENTS

| 1,775,250 A * | 9/1930 | Link ................ A47G 7/07 47/41.13 |
| 1,828,295 A | 10/1931 | Roy |
| 1,989,952 A * | 2/1935 | Thomas ............ A47G 7/07 47/41.13 |
| 3,368,303 A * | 2/1968 | Tong ................ A47G 7/07 47/41.12 |
| 5,115,915 A | 5/1992 | Harris |
| 2003/0009937 A1 * | 1/2003 | Delaney ............ A47G 7/07 47/41.01 |
| 2004/0244285 A1 | 12/2004 | Fishman et al. |
| 2005/0138862 A1 | 6/2005 | O'Connor |
| 2009/0307971 A1 * | 12/2009 | Driscoll .......... B43K 23/001 47/41.13 |
| 2019/0261583 A1 | 8/2019 | DeFoor |

FOREIGN PATENT DOCUMENTS

| FR | 2659828 B1 | 12/1992 | |
| FR | 2732548 A1 | 10/1996 | |
| GB | 191014197 A * | 4/1911 | ........... A47G 7/07 |
| GB | 104432 A * | 3/1917 | ........... A47G 7/07 |
| JP | 5722687 B2 | 5/2015 | |
| SE | 514482 C2 | 3/2001 | |
| WO | 2016120000 A1 | 8/2016 | |
| WO | 2019025448 A1 | 2/2019 | |

\* cited by examiner

*Primary Examiner* — Jessica B Wong
(74) *Attorney, Agent, or Firm* — Christopher G. Darrow; Darrow Mustafa PC (57) ABSTRACT

A plant transportation system includes a vase and a sealant receptacle. The vase includes a mouth, a throat and a reservoir. The sealant receptacle is housed in the throat. The sealant receptacle closes the throat from allowing items therethrough except through the sealant receptacle. The sealant receptacle is configured to allow stems therethrough, and retentively hold sealant therein all around occupant stems from the top and from the bottom.

20 Claims, 4 Drawing Sheets

PLANT TRANSPORTATION SYSTEM

TECHNICAL FIELD

The embodiments disclosed herein relate to a plant transportation system and, more particularly, to a plant transportation system configurable to serve as the basis for a horticultural arrangement.

BACKGROUND

Vases commonly serve as the basis for horticultural arrangements. In addition to the vases, standard horticultural arrangements include not only plants therein, such as flowers, but also liquid therein, such as water, around their stems. By drawing liquid in the vases through their stems, the plants enjoy prolonged freshness.

Retailers commonly sell horticultural arrangements to consumers. According to one established supply chain, rather than sourcing the actual horticultural arrangements, the retailers source the vases and the plants, and then make the horticultural arrangements onsite. Many retailers source the plants from overseas or otherwise non-local growers. Likewise, after growing the plants, the growers feed the supply chain by shipping the plants to the retailers. To help the plants withstand shipment, the growers typically employ specialty "wet" packaging for the plants. In addition to accommodating the plants, the wet packaging includes liquid therein around their stems. In much the same way as horticultural arrangements, the plants enjoy prolonged freshness by drawing liquid in the wet packaging through their stems. However, because the wet packaging includes liquid therein, the plants must be shipped as wet goods. Moreover, because they source the plants to make the horticultural arrangements onsite, the retailers ultimately dispose of the wet packaging.

For both the growers whose businesses depend on shipping the plants, and the retailers whose businesses depend on making the horticultural arrangements, the supply chain is fragmented and inefficient. For instance, the growers only make profit on the plants, not the horticultural arrangements sold to the consumers. Moreover, before making profit on the plants, the growers must absorb the costs of not only growing the plants, but also employing the wet packaging, and shipping the plants as wet goods. Likewise, before making profit on the horticultural arrangements, the retailers must absorb the costs of not only sourcing the vases and the plants, but also disposing of the wet packaging, and making the horticultural arrangements onsite.

SUMMARY

Disclosed herein are embodiments of a plant transportation system and an associated method of making a horticultural arrangement. In one aspect, a plant transportation system includes a vase and a sealant receptacle. The vase includes a mouth, a throat and a reservoir. The sealant receptacle is housed in the throat. The sealant receptacle closes the throat from allowing items therethrough except through the sealant receptacle. The sealant receptacle is configured to allow stems therethrough, and retentively hold sealant therein all around occupant stems from the top and from the bottom.

In another aspect, a plant transportation system includes a vase and a sealant receptacle. The vase includes a mouth, a throat and a reservoir. The sealant receptacle is housed in the throat. The sealant receptacle includes a cover extending across the throat, and a sealant tray extending across the throat behind the cover. The cover defines one or more cover apertures configured to allow stems therethrough, and inhibit sealant from escaping therethrough around occupant stems. The sealant tray defines a sealant tray aperture configured to allow stems therethrough, and inhibit sealant from escaping therethrough around occupant stems.

In yet another aspect, a method for making a horticultural arrangement involves a vase and a sealant receptacle. The vase includes a mouth, a throat and a reservoir. The sealant receptacle includes a cover defining one or more cover apertures configured to allow stems therethrough, and a sealant tray defining a sealant tray aperture configured to allow stems therethrough. According to the method, the reservoir is filled with liquid through the mouth. Moreover, the sealant receptacle is inserted into the throat through the mouth until housed in the throat, with the cover extending across the throat, and the sealant tray extending across the throat behind the cover. Moreover, stems are inserted through the sealant receptacle successively through the cover apertures and the sealant tray aperture. Moreover, the sealant receptacle is filled with semi-liquid sealant between the cover and the sealant tray. With the cover apertures inhibiting the sealant from escaping therethrough around the stems, and the sealant tray aperture inhibiting the sealant from escaping therethrough around the stems, the sealant receptacle retentively holds the sealant therein all around the stems, and the liquid is sealed from leaving the reservoir.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

Figure 1A:
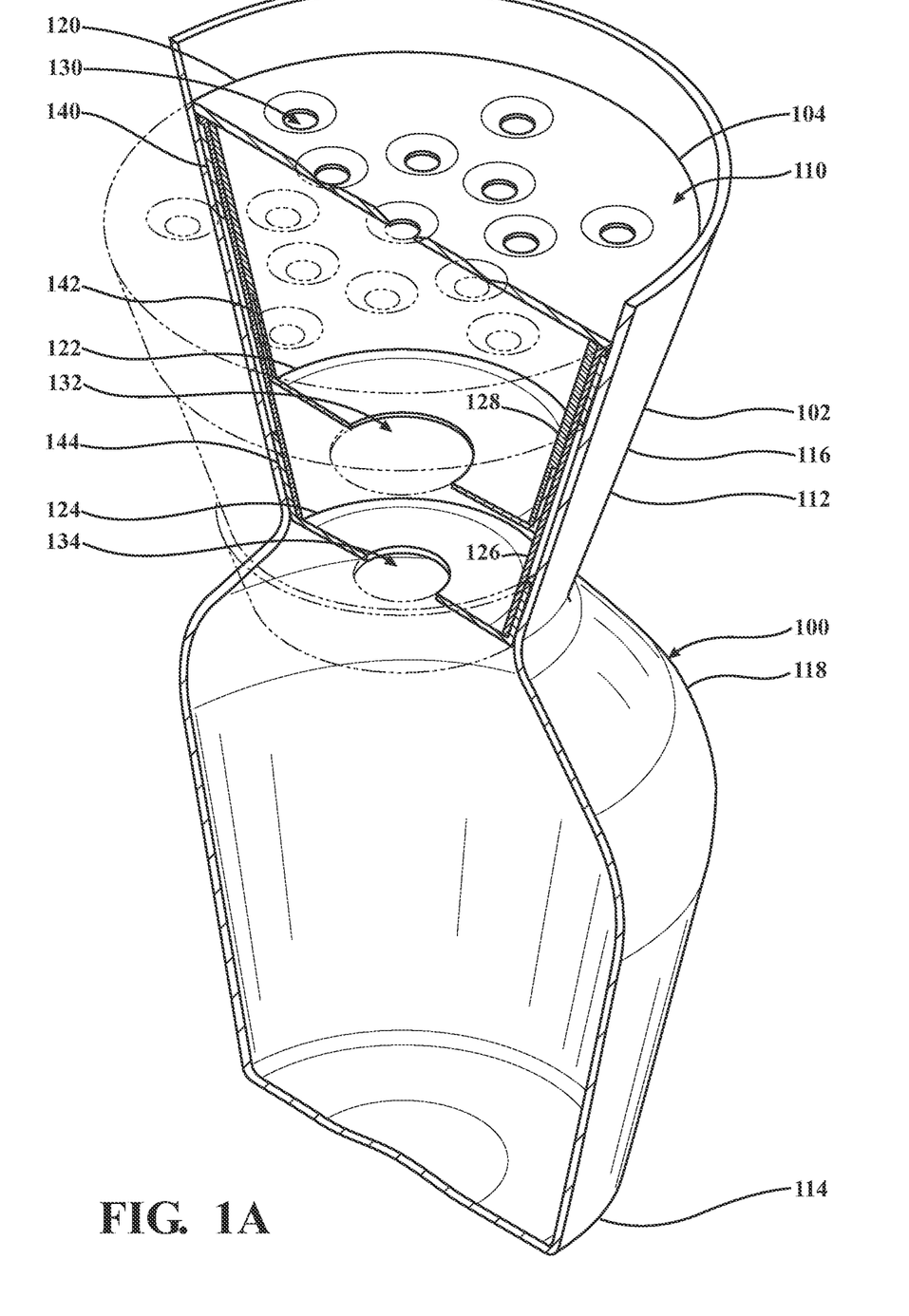
FIG. 1A is a partially cut-away perspective view of a plant transportation system in a dry state, showing a vase that includes a mouth, a throat and a reservoir, and a sealant receptacle housed in the throat that includes a cover, a sealant tray and a catch tray, as well as sleeving extending therebetween.

A plant transportation system 100 is shown in FIG. 1A. The plant transportation system 100 includes a vase 102, and a sealant receptacle 104 housed in the vase 102. The plant transportation system 100 is reconfigurable between a "dry" state and a "wet" state. As shown, the plant transportation system 100 is in the dry state. As described in additional detail below, from the dry state, the plant transportation system 100 is reconfigurable to the wet state by the addition of liquid, plants and sealant. Likewise, from the wet state, the plant transportation system 100 is reconfigurable to the dry state by the removal of previously-added liquid, plants and sealant.

Figure 1B:
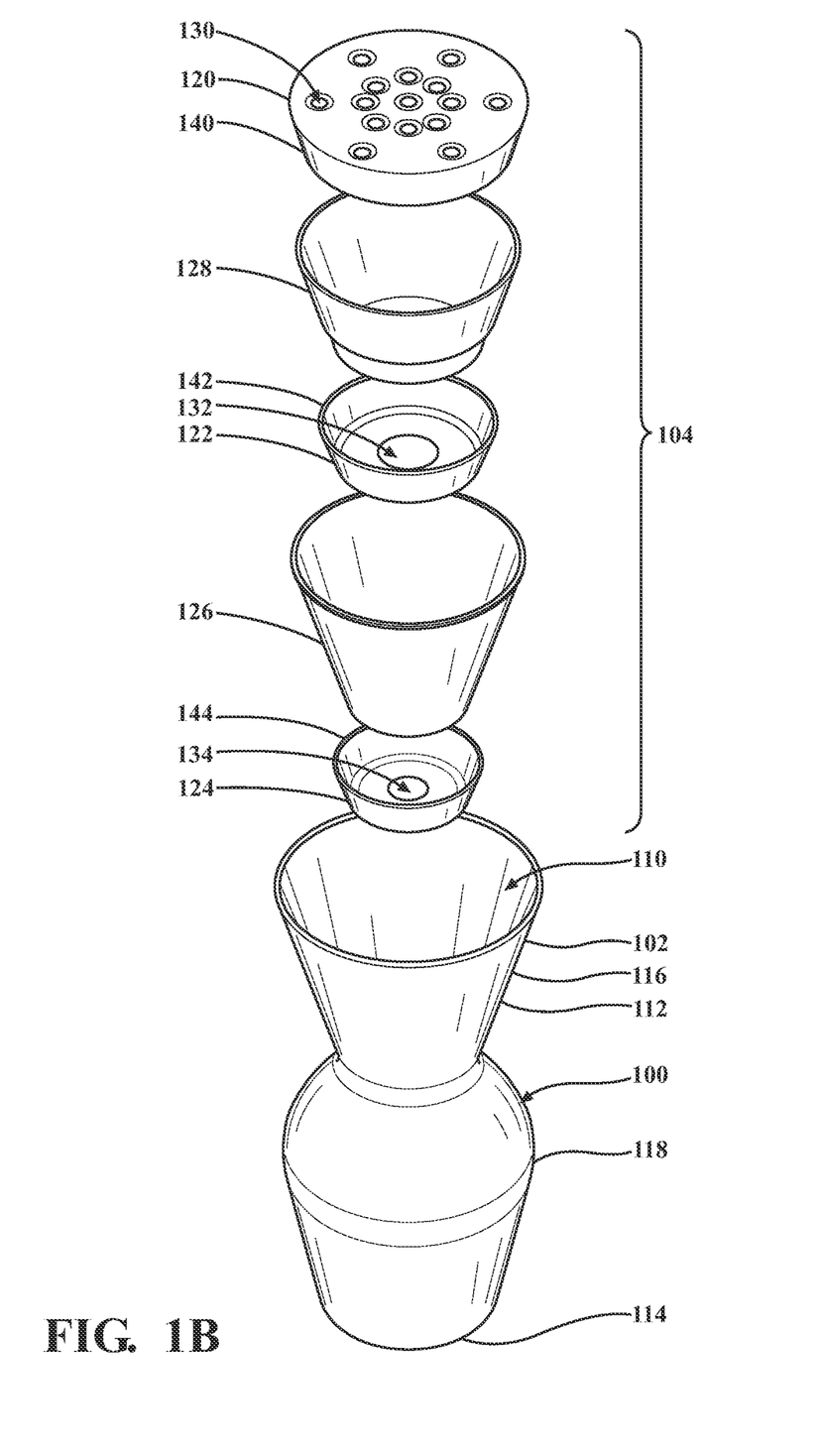
FIG. 1B is an assembly view of the plant transportation system in the dry state, showing aspects of the construction of the sealant receptacle.

As shown with additional reference to FIG. 1B, the vase 102 has an open-topped, closed-sided and closed-bottomed hollow construction. As part of its construction, the vase 102 includes an open mouth 110, a tubular sidewall 112, and a closed base 114. The sidewall 112 frames the mouth 110. In spaced opposition with the mouth 110, the base 114 extends across the sidewall 112. As shown, the base 114 serves as the foot of the vase 102. In other implementations, it is contemplated that an item besides the base 114 may serve as the foot of the vase 102.

As a related part of its construction, the vase 102 includes regions whose formation is based on the sidewall 112. The regions successively extend behind the mouth 110, and continuously close the vase 102. From top to bottom, the regions include a tubular throat 116 formed by the sidewall 112, and a cuplike reservoir 118 formed by the sidewall 112 and the base 114. The mouth 110 is configured to allow items therethrough. The throat 116 is configured to allow items therethrough, and house the sealant receptacle 104 therein. The reservoir 118 is configured to allow items therein, and store liquid therein. From outside the vase 102, the mouth 110 opens into the throat 116 from the top. Leading from the mouth 110, the throat 116 extends behind the mouth 110, and closes the vase 102 from the side. From inside the vase 102, the throat 116 opens into the reservoir 118 from the top. Leading from the throat 116, the reservoir 118 extends behind the throat 116, and closes the vase 102 from the side and from the bottom. As shown, the throat 116 leads immediately from the mouth 110. Moreover, the reservoir 118 leads immediately from the throat 116. In other implementations, it is contemplated that the throat 116 may lead non-immediately from the mouth 110 through one or more intermediate regions. Moreover, it is contemplated that the reservoir 118 may lead non-immediately from the throat 116 through one or more intermediate regions.

The vase 102 has a figure, and, along the regions, includes regional shapes therefor. As shown, having a compound figure, the vase 102 includes distinct regional shapes for the regions. Likewise, the regions have their own distinct regional shapes. In other implementations, it is contemplated that, having a simple figure, the vase 102 may include indistinct regional shapes for the regions. Likewise, it is contemplated that the regions may lack their own distinct regional shapes.

As shown, having a thistle-shaped figure, the vase 102 is frustum-shaped along the throat 116, spindle-shaped along the reservoir 118, and hourglass-shaped along the junction between the throat 116 and the reservoir 118. Likewise, having its own distinct regional shape, the throat 116 is frustum-shaped. In particular, the throat 116 is frustoconical. Moreover, having its own distinct regional shape, the reservoir 118 is spindle-shaped. Moreover, the junction between the throat 116 and the reservoir 118 is hourglass-shaped. Accordingly, the throat 116 narrows toward the junction between the throat 116 and the reservoir 118. Likewise, forming a shoulder, the reservoir 118 broadens away from the junction between the throat 116 and the reservoir 118.

As noted above, the sealant receptacle 104 is housed in the vase 102. In particular, the sealant receptacle 104 is housed in the throat 116. Likewise, the sealant receptacle 104 is housed over the reservoir 118. From in the throat 116, the sealant receptacle 104 extends across the throat 116. Extending across the throat 116, the sealant receptacle 104 closes the throat 116 from allowing items therethrough except through the sealant receptacle 104. Moreover, the sealant receptacle 104 extends along the throat 116. In particular, recessed inside the throat 116 behind the mouth 110, and otherwise extending along the length of the throat 116, the sealant receptacle 104 extends substantially along the length of the throat 116.

As noted above, from the dry state, the plant transportation system 100 is reconfigurable to the wet state by the addition of liquid, plants and sealant. With respect to the addition of plants, the sealant receptacle 104 is configured to allow stems therethrough, leaving occupant stems inside the sealant receptacle 104, the ends of occupant stems in the reservoir 118, and the tops of the plants to which occupant stems belong over the vase 102. As shown, the sealant receptacle 104 is configured to allow a defined amount of stems therethrough. The amount of stems that the sealant receptacle 104 is configured to allow therethrough may be defined by any combination of one or more numbers of stems, one or more types of stems, one or more sizes of stems, and the like. For instance, as shown, the sealant receptacle 104 is configured to allow a predetermined number of stems of stems of focal flowers typical of floral arrangements, such as roses, therethrough. In other implementations, it is contemplated that the sealant receptacle 104 may be configured to allow a defined amount of stems of other plants typical of horticultural arrangements, including other flowers typical of floral arrangements, therethrough. With respect to the addition of sealant, the sealant receptacle 104 is configured to retentively hold sealant therein all around occupant stems. In addition to being configured to retentively hold sealant therein from the bottom, the sealant receptacle 104 is configured to retentively hold sealant therein from the top. Moreover, the sealant receptacle 104 is configured to retentively hold sealant therein from the side in isolation from the throat 116. Moreover, the sealant receptacle 104 is configured to retentively hold escaping sealant, if any, therein from the bottom. In addition to being configured to retentively hold escaping sealant therein from the bottom, the sealant receptacle 104 is configured to retentively hold escaping sealant therein from the side in isolation from the throat 116.

The sealant receptacle 104 includes a semi-open-topped, closed-sided and semi-closed-bottomed hollow construction. As part of its construction, the sealant receptacle 104 includes a semi-open cover 120, a semi-open sealant tray 122, and a semi-open catch tray 124. Moreover, the sealant receptacle 104 includes tubular sleeving 126, 128. As shown, the sleeving 126, 128 is rendered by a tubular outer sleeve 126, and a tubular inner sleeve 128.

Recessed inside the throat 116 behind the mouth 110, the cover 120 extends across the throat 116. Extending across the throat 116, the cover 120 closes the throat 116 from allowing items therethrough except through the cover 120. Otherwise closed, the cover 120 defines one or more cover apertures 130 for allowing stems therethrough. From outside the sealant receptacle 104, the cover apertures 130 lead into the sealant receptacle 104, and toward the reservoir 118, from the top. The cover apertures 130 are configured to allow stems therethrough. Likewise, the cover 120 is configured to allow stems therethrough through the cover apertures 130. Moreover, to retentively hold sealant in the sealant receptacle 104 from the top, the cover apertures 130 are configured to inhibit sealant from escaping therethrough around occupant stems. Likewise, the cover 120 is configured to inhibit sealant from escaping therethrough through the cover apertures 130 around occupant stems. With respect to the defined amount of stems that the sealant receptacle 104 is configured to allow therethrough, as shown, the cover 120 defines multiple cover apertures 130 each for allowing only some stems therethrough. In particular, the cover 120 defines multiple cover apertures 130 each for allowing only single stems of focal flowers typical of floral arrangements, such as roses, therethrough. In other implementations, it is contemplated that the cover 120 may define a single, common cover aperture 130 for allowing all stems therethrough.

Intermediately along the throat 116, in spaced opposition with the cover 120, the sealant tray 122 extends across the throat 116 behind the cover 120. Extending across the throat 116, the sealant tray 122 closes the throat 116 from allowing items therethrough except through the sealant tray 122. Otherwise closed, the sealant tray 122 defines a sealant tray aperture 132 for allowing stems therethrough. From inside the sealant receptacle 104, the sealant tray aperture 132 leads out of the sealant receptacle 104, and toward the reservoir 118, from the top. The sealant tray aperture 132 is configured to allow stems therethrough. Likewise, the sealant tray 122 is configured to allow stems therethrough through the sealant tray aperture 132. Moreover, to retentively hold sealant in the sealant receptacle 104 from the bottom, the sealant tray aperture 132 is configured to inhibit sealant from escaping therethrough around occupant stems. Likewise, the sealant tray 122 is configured to inhibit sealant from escaping therethrough through the sealant tray aperture 132 around occupant stems. With respect to the defined amount of stems that the sealant receptacle 104 is configured to allow therethrough, as shown, the sealant tray 122 defines a single, common sealant tray aperture 132 for allowing all stems therethrough. In other implementations, it is contemplated that the sealant tray 122 may define multiple sealant tray apertures 132 each for allowing only some stems therethrough, such as multiple sealant tray apertures 132 each for allowing only single stems therethrough.

Terminally along the throat 116, in spaced opposition with the sealant tray 122, the catch tray 124 extends across the throat 116 behind the sealant tray 122. Extending across the throat 116, the catch tray 124 closes the throat 116 from allowing items therethrough except through the catch tray 124. Otherwise closed, the catch tray 124, similarly to the sealant tray 122, defines a catch tray aperture 134 for allowing stems therethrough. From inside the sealant receptacle 104, the catch tray aperture 134 leads out of the sealant receptacle 104, and toward the reservoir 118, from the top. The catch tray aperture 134 is configured to allow stems therethrough. Likewise, the catch tray 124 is configured to allow stems therethrough through the catch tray aperture 134. Moreover, to retentively hold escaping sealant in the sealant receptacle 104 from the bottom, the catch tray aperture 134 is configured to inhibit escaping sealant from escaping therethrough around occupant stems. Likewise, the catch tray 124 is configured to inhibit escaping sealant from escaping therethrough through the catch tray aperture 134 around occupant stems. With respect to the defined amount of stems that the sealant receptacle 104 is configured to allow therethrough, as shown, the catch tray 124 defines a single, common catch tray aperture 134 for allowing all stems therethrough. In other implementations, it is contemplated that the catch tray 124 may define multiple catch tray apertures 134 each for allowing only some stems therethrough, such as multiple catch tray apertures 134 each for allowing only single stems therethrough.

To allow stems therethrough, the sealant receptacle 104 defines passageways therethrough successively through the cover apertures 130, the sealant tray aperture 132 and the catch tray aperture 134. As noted above, the cover 120 defines multiple cover apertures 130 each for allowing only some stems therethrough. Moreover, the sealant tray 122 defines a single, common sealant tray aperture 132 for allowing all stems therethrough, and, similarly to the sealant tray 122, the catch tray 124 defines a single, common catch tray aperture 134 for allowing all stems therethrough. As shown, to separate occupant stems from one another inside the sealant receptacle 104, and promote the presence of sealant in the sealant receptacle 104 all around occupant stems, the cover apertures 130 are distributed on the cover 120. In particular, the cover apertures 130 are peripherally, intermediately and centrally arranged on the cover 120. Moreover, to both disperse the ends of occupant stems from one another in the reservoir 118, and disperse the tops of the plants to which occupant stems belong from one another over the vase 102, the sealant tray aperture 132 is centrally arranged on the sealant tray 122, and, similarly to the sealant tray 122, the catch tray aperture 134 is centrally arranged on the catch tray 124.

As noted above, the sleeving 126, 128 is rendered by the outer sleeve 126 and the inner sleeve 128. As part of the sleeving 126, 128, from outside the inner sleeve 128, the outer sleeve 126 is stacked between the cover 120 and the catch tray 124. Moreover, from inside the outer sleeve 126, the inner sleeve 128 is stacked between the cover 120 and the sealant tray 122. To retentively hold sealant in the sealant receptacle 104 from the side in isolation from the throat 116, leading from the cover 120, the inner sleeve 128 extends behind the cover 120 to the sealant tray 122, and closes the sealant receptacle 104 from the side. Leading from the cover 120, the outer sleeve 126 extends behind the cover 120 past the sealant tray 122. To retentively hold escaping sealant in the sealant receptacle 104 from the side in isolation from the throat 116, leading from the sealant tray 122, the outer sleeve 126 extends behind the sealant tray 122 to the catch tray 124, and closes the sealant receptacle 104 from the side.

As shown, the sealant receptacle 104 is housed in the throat 116 as a unitary module. As a unitary module, from outside the vase 102, the sealant receptacle 104 is insertable into the throat 116 through the mouth 110. Likewise, the sealant receptacle 104 is removable from and re-insertable into the throat 116 through the mouth 110. Inserted into the throat 116, the sealant receptacle 104 is supported in the throat 116. As shown, similarly to the throat 116, the sealant receptacle 104 is frustum-shaped. In particular, the sealant receptacle 104 is frustoconical. Accordingly, the sealant receptacle 104 is supported by the throat 116 by frustum-in-frustum interfacing. Moreover, the sealant receptacle 104 is lodged in the throat 116 by friction.

As shown with particular reference to FIG. 1B, in an integrated multi-piece construction of the sealant receptacle 104, the cover 120, the sealant tray 122, the catch tray 124 and the sleeving 126, 128, including the outer sleeve 126 and the inner sleeve 128, include complementary features for removable securement with one another. As shown, the cover 120 includes a tubular downturned edge 140 thereon, the sealant tray 122 includes a tubular upturned edge 142 thereon, and the catch tray 124 includes a tubular upturned edge 144 thereon. The outer sleeve 126 is removably push-fit inside the downturned edge 140 and the upturned edge 144. Moreover, the upturned edge 142 is removably push-fit inside the outer sleeve 126, and, with the upturned edge 142 removably push-fit inside the outer sleeve 126, the inner sleeve 128 is removably push-fit inside the upturned edge 142 and the outer sleeve 126.

Following the frustum-shaped configuration of the sealant receptacle 104, on the cover 120, the downturned edge 140 is frustum-shaped. Moreover, on the catch tray 124, the upturned edge 144 is frustum-shaped. Likewise, push-fit inside the downturned edge 140 and the upturned edge 144, the outer sleeve 126 is frustum-shaped. Moreover, push-fit inside the outer sleeve 126, on the sealant tray 122, the upturned edge 142 is frustum-shaped. Moreover, push-fit inside the upturned edge 142 and the outer sleeve 126, the inner sleeve 128 is frustum-shaped. In particular, the downturned edge 140 on the cover 120, the upturned edge 142 on the sealant tray 122, and the upturned edge 144 on the catch tray 124, are frustoconical. Likewise, the outer sleeve 126 and the inner sleeve 128 are frustoconical.

Figure 2A:
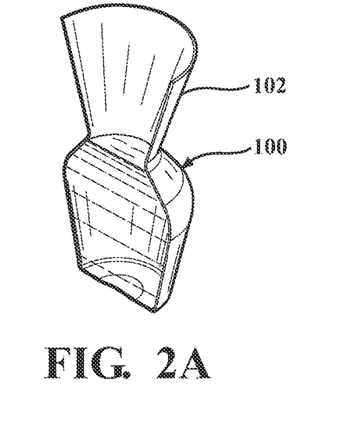
FIGS. 2A-2E portray the operations of a method for making a horticultural arrangement, showing the plant transportation system being reconfigured from the dry state to a wet state by the addition of liquid, plants and sealant, and, in the wet state, serving as the basis for the horticultural arrangement.
Figure 2B:
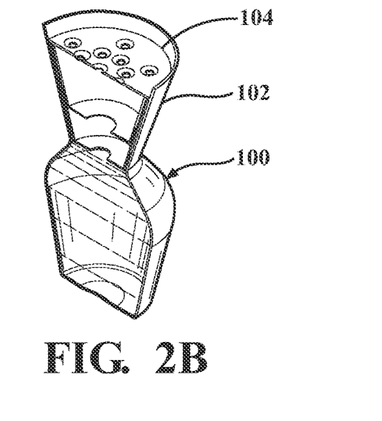
Figure 2C:
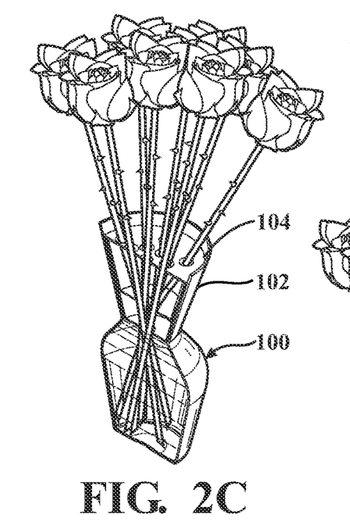
Figure 2D:
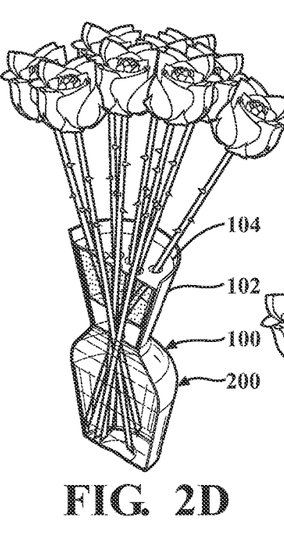
Figure 2E:
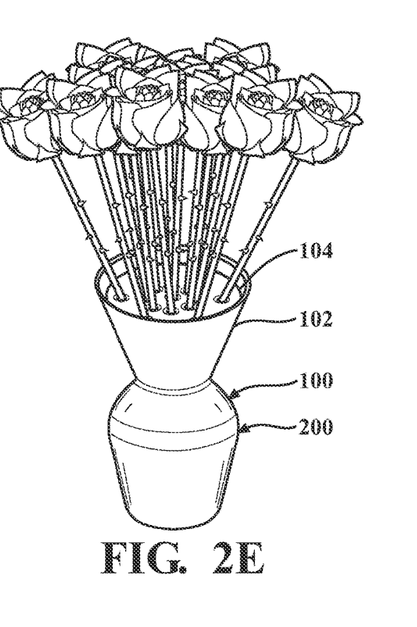

As noted above, and shown with additional reference to FIGS. 2A-2E, from the dry state, the plant transportation system 100 is reconfigurable to the wet state by the addition of liquid, plants and sealant. As shown in FIG. 2E, in the wet state, the plant transportation system 100 serves as the basis for a transportable, consumer-ready horticultural arrangement 200. Likewise, FIGS. 2A-2E portray the operations of a method for making the horticultural arrangement 200, including reconfiguring the plant transportation system 100 from the dry state to the wet state by the addition of liquid, plants and sealant. The method for making the horticultural arrangement 200 is portrayed with reference to representative plants. In particular, the method for making the horticultural arrangement 200 is portrayed with reference to focal flowers typical of floral arrangements, such as roses. Likewise, the horticultural arrangement 200 made according to the method therefor is shown as a floral arrangement. In other implementations, it is contemplated that the method for making the horticultural arrangement 200 may be employed using other plants typical of horticultural arrangements, including other flowers typical of floral arrangements.

As shown in FIG. 2A, with the sealant receptacle 104 removed from the throat 116 through the mouth 110, the reservoir 118 is filled with liquid, such as water, including pure water and water mixtures, through the mouth 110. As shown, the reservoir 118 is filled with liquid up to or otherwise below the junction between the throat 116 and the reservoir 118.

As shown in FIG. 2B, with liquid in the reservoir 118, the sealant receptacle 104 is inserted into the throat 116 through the mouth 110 until housed in the throat 116, and, likewise, over the reservoir 118, including liquid in the reservoir 118. As shown, with the cover 120, the sealant tray 122, the catch tray 124 and the sleeving 126, 128 removably secured with one another, the sealant receptacle 104 is inserted into the throat 116 through the mouth 110 as a unitary module. In other implementations, it is contemplated that the sealant receptacle 104 may be inserted into the throat 116 through the mouth 110 piece-by-piece.

As shown in FIG. 2C, with the sealant receptacle 104 housed in the throat 116, stems are inserted through the sealant receptacle 104 successively through the cover apertures 130, the sealant tray aperture 132 and the catch tray aperture 134, leaving occupant stems inside the sealant receptacle 104, the ends of occupant stems in the reservoir 118, and the tops of the plants to which occupant stems belong over the vase 102. By drawing liquid in the reservoir 118 therethrough, the plants to which occupant stems belong enjoy prolonged freshness. As shown, the ends of occupant stems are dispersed from one another in the reservoir 118, promoting the draw of liquid in the reservoir 118 therethrough. Moreover, the tops of the plants to which occupant stems belong are dispersed from one another over the vase 102, promoting the fullness of the horticultural arrangement 200.

As shown in FIG. 2D, with occupant stems inside the sealant receptacle 104, the sealant receptacle 104 is filled with sealant between the cover 120 and the sealant tray 122, including, with occupant stems therethrough, to the cover apertures 130 and to the sealant tray aperture 132. At the same time, the sealant receptacle 104 is filled with sealant to the sleeving 126, 128, and, in particular, to the inner sleeve 128. As shown, occupant stems are separated from one another inside the sealant receptacle 104, promoting the presence of sealant in the sealant receptacle 104 all around occupant stems. With the cover apertures 130 inhibiting sealant from escaping therethrough around occupant stems, and the sealant tray aperture 132 inhibiting sealant from escaping therethrough around occupant stems, the sealant receptacle 104 retentively holds sealant therein all around occupant stems from the top and from the bottom. Moreover, with the inner sleeve 128 closing the sealant receptacle 104 from the side, the sealant receptacle 104 retentively holds sealant therein from the side in isolation from the throat 116. With the sealant receptacle 104 retentively holding sealant therein all around occupant stems, liquid in the reservoir 118 is sealed from evaporating, splashing, pouring or otherwise leaving the reservoir 118. Moreover, with the catch tray aperture 134 inhibiting escaping sealant from escaping therethrough around occupant stems, the sealant receptacle 104 retentively holds escaping sealant, if any, therein from the bottom. With the sealant receptacle 104 retentively holding escaping sealant, if any, therein from the bottom, liquid in the reservoir 118 does not suffer the threat of comingling with sealant in the sealant receptacle 104.

In one implementation, the sealant is a semi-liquid, such as pre-hydrated super absorbent polymer (SAP). Because pre-hydrated SAP and like semi-liquids are both freeform and non-solidifying, their employment as sealant promotes not only effective sealing of liquid in the reservoir 118, but also later removal from the sealant receptacle 104.

As shown in FIG. 2E, the resulting horticultural arrangement 200 is not only consumer-ready, but also transportable. Among other advantages, despite the presence of liquid in the reservoir 118, the horticultural arrangement 200 may be shipped in bulk with like horticultural arrangements 200 as dry goods. At the same time, because of the presence of liquid in the reservoir 118, with the plants enjoying prolonged freshness, the horticultural arrangement 200 enjoys both prolonged shelf life in the hands of retailers, and prolonged service life in the hands of consumers. Accordingly, taking advantage of the plant transportation system 100 to make the horticultural arrangement 200, overseas and otherwise non-local growers may make profits on not only the plants, but also the horticultural arrangement 200 sold to the consumers. Moreover, the growers may avoid the costs of employing wet packaging, and shipping plants as wet goods. Likewise, the retailers may avoid the costs of not only making the horticultural arrangement 200 onsite, but also sourcing the vase 102, and disposing of wet packaging.

Moreover, as noted above, from the wet state, the plant transportation system 100 is reconfigurable to the dry state by the removal of previously-added liquid, plants and sealant. In the dry state, the plant transportation system 100 is reusable, in whole or in part. For instance, either the consumers or the retailers may return the plant transportation system 100 to the growers, where, back in the hands of the growers, it may serve as the basis for a new horticultural arrangement 200. Alternatively, either the consumers or the retailers may return the sealant receptacle 104 to the growers, but keep the vase 102. In the hands of the consumers or the retailers, as the case may be, the vase 102 may serve uses typical of vases, including serving as the basis for standard horticultural arrangements.

Figure 3A:
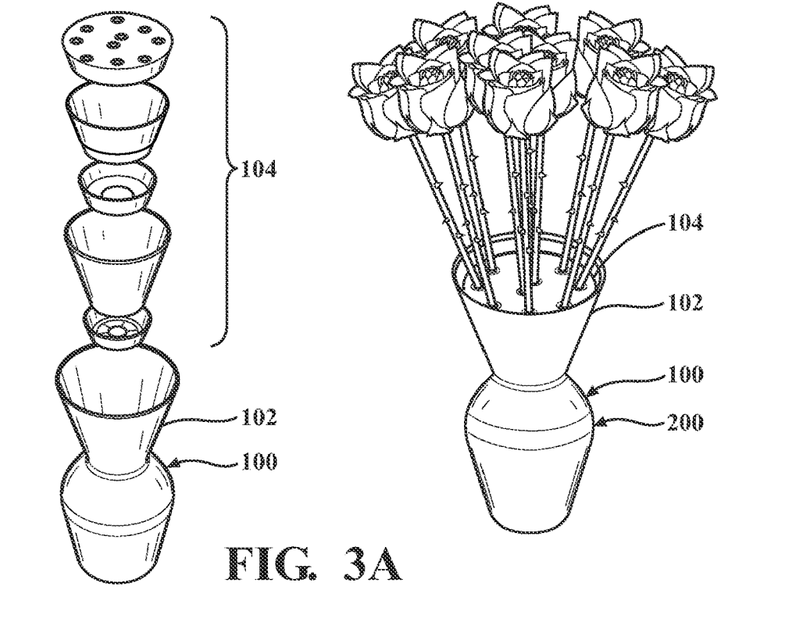
FIGS. 3A and 3B are assembly views of the plant transportation system in the dry state, and perspective views of the plant transportation system in the wet state, showing aspects of scaling the plant transportation system.
Figure 3B:
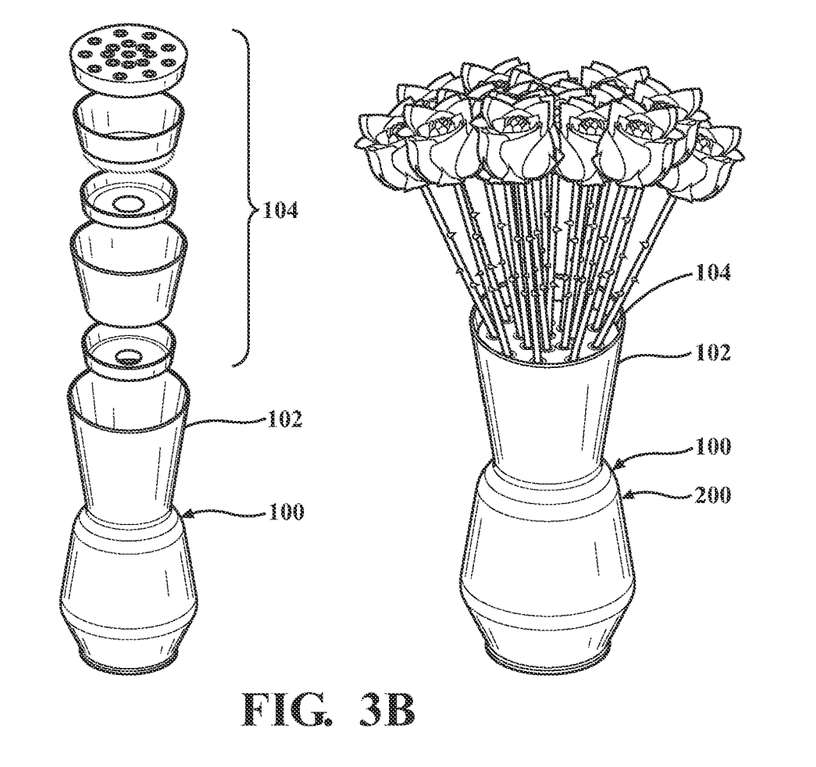

Moreover, as shown with additional reference to FIGS. 3A and 3B, the plant transportation system 100 is straightforwardly scalable. For instance, as shown in FIGS. 1A, 1B and 2A-2E, the plant transportation system 100 has a medium size. As shown in FIG. 3A, from the medium size, the plant transportation system 100 is scalable to a small size by narrowing the vase 102 and the sealant receptacle 104, and reducing the number of cover apertures 130, and the sizes of the sealant tray aperture 132 and the catch tray aperture 134, for fewer stems. Moreover, as shown in FIG. 3B, from the medium size, the plant transportation system 100 is scalable to a large size by widening the vase 102 and the sealant receptacle 104, and increasing the number of cover apertures 130, and the sizes of the sealant tray aperture 132 and the catch tray aperture 134, for more stems.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A plant transportation system, comprising:
   a vase, the vase including a mouth, a throat and a reservoir; and
   a sealant receptacle housed in the throat, the sealant receptacle including a semi-open-topped, closed-sided and semi-closed-bottomed hollow construction, including a cover extending across the throat, and a sealant tray extending across the throat behind the cover, the cover defining one or more cover apertures configured to allow stems therethrough, and inhibit semi-liquid sealant in the sealant receptacle from escaping therethrough around occupant stems, and the sealant tray defining a sealant tray aperture configured to allow stems therethrough, and inhibit semi-liquid sealant in the sealant receptacle from escaping therethrough around occupant stems.

2. The plant transportation system of claim 1, wherein the sealant receptacle is configured to allow a defined amount of stems therethrough, and with respect to the defined amount of stems that the sealant receptacle is configured to allow therethrough, the cover defines multiple cover apertures each configured to allow only some stems therethrough, and the sealant tray defines a single, common sealant tray aperture configured to allow all stems therethrough.

3. The plant transportation system of claim 1, wherein the cover is recessed inside the throat behind the mouth, and the sealant tray is intermediately along the throat.

4. The plant transportation system of claim 1, wherein the sealant receptacle includes sleeving extending between the cover and the sealant tray, the sleeving closing the sealant receptacle from the side.

5. The plant transportation system of claim 1, wherein the sealant receptacle includes a catch tray extending across the throat behind the sealant tray, the catch tray defining a catch tray aperture configured to allow stems therethrough, and inhibit escaping semi-liquid sealant in the sealant receptacle from escaping therethrough around occupant stems.

6. The plant transportation system of claim 5, wherein the sealant receptacle is configured to allow a defined amount of stems therethrough, and with respect to the defined amount of stems that the sealant receptacle is configured to allow therethrough, the cover defines multiple cover apertures each configured to allow only some stems therethrough, the sealant tray defines a single, common sealant tray aperture configured to allow all stems therethrough, and the catch tray defines a single, common catch tray aperture configured to allow all stems therethrough.

7. The plant transportation system of claim 5, wherein the cover is recessed inside the throat behind the mouth, the sealant tray is intermediately along the throat, and the catch tray is terminally along the throat.

8. The plant transportation system of claim 5, wherein the sealant receptacle includes sleeving extending between the cover and the sealant tray, and between the sealant tray and the catch tray, the sleeving closing the sealant receptacle from the side.

9. The plant transportation system of claim 1, wherein the throat is frustum-shaped, the sealant receptacle is frustum-shaped, and the sealant receptacle is supported by the throat by frustum-in-frustum interfacing, and lodged in the throat by friction.

10. A method for making a horticultural arrangement, comprising:
    in a vase including a mouth, a throat and a reservoir, filling the reservoir with liquid through the mouth;
    inserting a sealant receptacle including a semi-open-topped, closed-sided and semi-closed-bottomed hollow construction, including a cover defining one or more cover apertures configured to allow stems therethrough, and a sealant tray defining a sealant tray aperture configured to allow stems therethrough, into the throat through the mouth until housed in the throat, with the cover extending across the throat, and the sealant tray extending across the throat behind the cover;
    inserting stems through the sealant receptacle successively through the cover apertures and the sealant tray aperture, leaving occupant stems inside the sealant receptacle; and
    filling the sealant receptacle with semi-liquid sealant between the cover and the sealant tray, whereby, with the cover apertures inhibiting the semi-liquid sealant in the sealant receptacle from escaping therethrough around the occupant stems, and the sealant tray aperture inhibiting the semi-liquid sealant in the sealant receptacle from escaping therethrough around the occupant stems, the sealant receptacle retentively holds the semi-liquid sealant therein all around the occupant stems, and the liquid is sealed from leaving the reservoir.

11. The plant transportation system of claim 1, wherein the sealant receptacle is configured to allow a predetermined number of stems of roses therethrough, and with respect to the predetermined number of stems of roses that the sealant receptacle is configured to allow therethrough, the cover defines multiple cover apertures each configured to allow only single stems of roses therethrough, and the sealant tray defines a single, common sealant tray aperture configured to allow all stems of roses therethrough.

12. The plant transportation system of claim 11, wherein the predetermined number of stems of roses that the sealant receptacle is configured to allow therethrough is between ten and eighteen inclusive.

13. The plant transportation system of claim 3, wherein the throat narrows toward the junction between the throat and the reservoir.

14. The plant transportation system of claim 5, wherein the sealant receptacle is configured to allow a predetermined number of stems of roses therethrough, and with respect to the predetermined number of stems of roses that the sealant receptacle is configured to allow therethrough, the cover defines multiple cover apertures each configured to allow only single stems of roses therethrough, the sealant tray defines a single, common sealant tray aperture configured to allow all stems of roses therethrough, and the catch tray defines a single, common catch tray aperture configured to allow all stems of roses therethrough.

15. The plant transportation system of claim 14, wherein the predetermined number of stems of roses that the sealant receptacle is configured to allow therethrough is between ten and eighteen inclusive.

16. The plant transportation system of claim 7, wherein the throat narrows toward the junction between the throat and the reservoir.

17. The plant transportation system of claim 1, wherein the sealant receptacle is housed in the throat as a unitary module, and removable from the throat through the mouth as a unitary module.

18. The plant transportation system of claim 4, wherein the cover, the sealant tray and the sleeving are removably secured with one another, and the sealant receptacle is housed in the throat as a unitary module, and removable from the throat through the mouth as a unitary module.

19. The plant transportation system of claim 8, wherein the cover, the sealant tray, the catch tray and the sleeving are removably secured with one another, and the sealant receptacle is housed in the throat as a unitary module, and removable from the throat through the mouth as a unitary module.

20. The plant transportation system of claim 1, further comprising:

liquid in the reservoir;

stems inserted through the sealant receptacle successively through the cover apertures and the sealant tray aperture, leaving occupant stems inside the sealant receptacle; and semi-liquid sealant filling the sealant receptacle between the cover and the sealant tray.

* * * * *